US009414233B2

(12) United States Patent
Park et al.

(10) Patent No.: US 9,414,233 B2
(45) Date of Patent: Aug. 9, 2016

(54) METHOD FOR MANAGING PROFILE OF EMBEDDED UICC, AND EMBEDDED UICC, EMBEDDED UICC-EQUIPPED TERMINAL, PROVISION METHOD, AND METHOD FOR CHANGING MNO USING SAME

(75) Inventors: Jaemin Park, Seoul (KR); Jinhyoung Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/342,986

(22) PCT Filed: Sep. 4, 2012

(86) PCT No.: PCT/KR2012/007065
§ 371 (c)(1),
(2), (4) Date: Mar. 5, 2014

(87) PCT Pub. No.: WO2013/036011
PCT Pub. Date: Mar. 14, 2013

(65) Prior Publication Data
US 2014/0219447 A1    Aug. 7, 2014

(30) Foreign Application Priority Data

Sep. 5, 2011    (KR) .......... 10-2011-0089638
Sep. 23, 2011    (KR) .......... 10-2011-0096210
Sep. 28, 2011    (KR) .......... 10-2011-0097900

(51) Int. Cl.
*H04K 1/00* (2006.01)
*H04W 12/08* (2009.01)
*H04W 12/04* (2009.01)

(52) U.S. Cl.
CPC .............. *H04W 12/08* (2013.01); *H04W 12/04* (2013.01)

(58) Field of Classification Search
CPC .................................................. H04W 12/08

USPC ......................................................... 380/247
See application file for complete search history.

(56) References Cited

U.S. PATENT DOCUMENTS 8,131,317 B2    3/2012    Lee
8,352,749 B2 *  1/2013    von Behren ........ G06Q 20/3552
                                                        235/492

(Continued)

FOREIGN PATENT DOCUMENTS

KR    10-2003-0037057 A    5/2003
KR    10-2006-0130312 A    12/2006
KR    10-2008-0021178 A    3/2008

OTHER PUBLICATIONS

International Search Report for PCT/KR2012/007065 dated Feb. 19, 2013.

(Continued)

*Primary Examiner* — Peter Shaw
(74) *Attorney, Agent, or Firm* — Sughrue Mion, PLLC

(57) ABSTRACT

The present invention provides a method wherein an MNO receives a secret key allocated to a corresponding embedded UICC (eUICC) through SM-SR (secure routing) in an environment where SM is divided and implemented as SM-SR and SM-DP (data preparation), that is, provided is a method wherein the MNO dynamically acquires the secret key (public key or the like) from the corresponding eUICC through the SM-SR and uses the acquired secret key. In addition, the present invention allows the eUICC to receive an encrypted profile from the MNO or the SM and decrypts the encrypted profile using profile access credential information (a secret key corresponding to an eUICC public key) stored in the eUICC to use the decrypted profile, thereby securely transmitting important data such as operation profiles, and blocking external entities such as a device or terminal from accessing the important data.

13 Claims, 8 Drawing Sheets

(56) References Cited

U.S. PATENT DOCUMENTS

| | | | |
|---|---|---|---|
| 8,532,295 B2 * | 9/2013 | Benteo | H04L 9/0869 380/255 |
| 2003/0041245 A1 * | 2/2003 | Chan | H04L 63/0428 713/176 |
| 2009/0205028 A1 | 8/2009 | Smeets et al. | |

OTHER PUBLICATIONS

Written Opinion for PCT/KR2012/007065 dated Feb. 19, 2013.

* cited by examiner

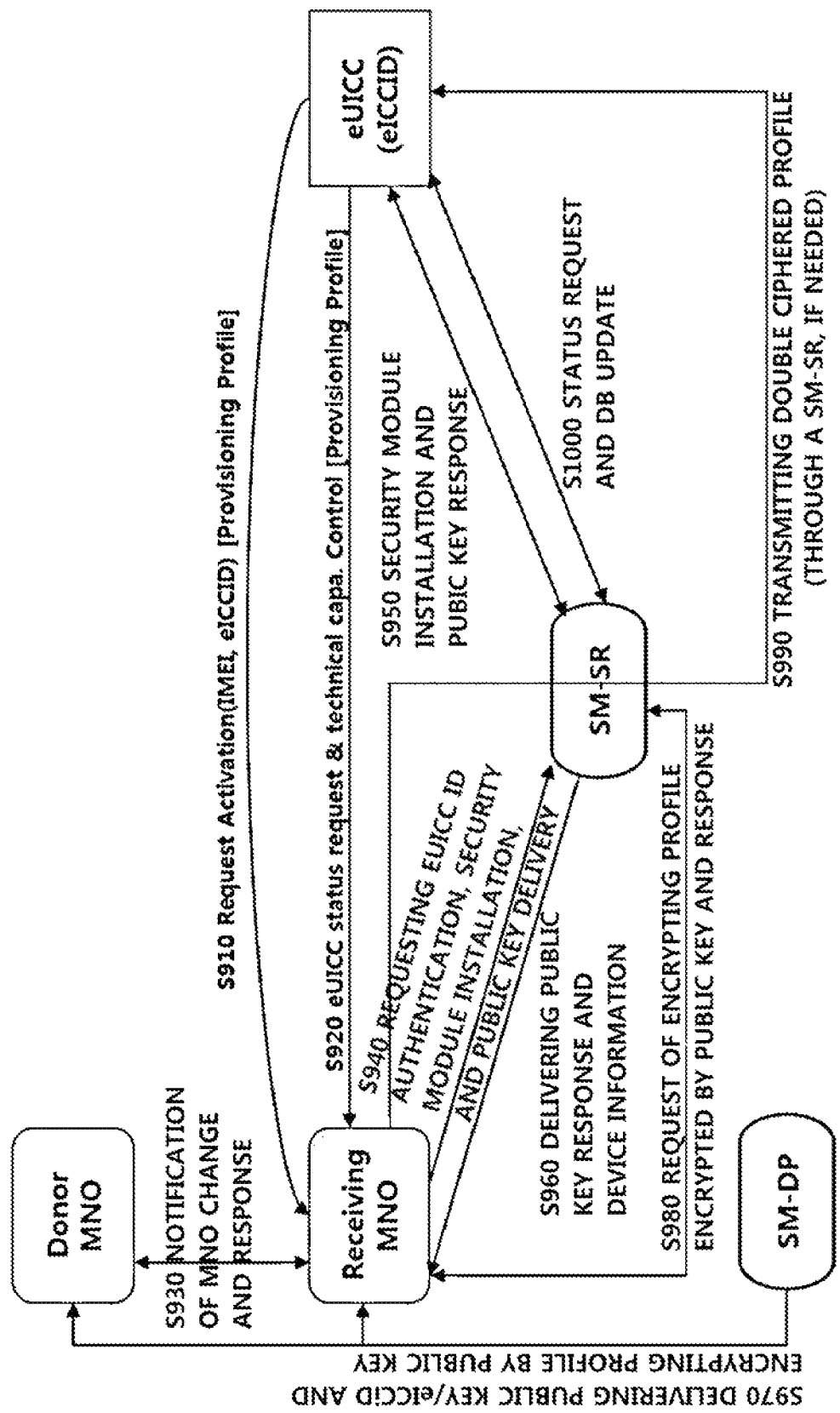

METHOD FOR MANAGING PROFILE OF EMBEDDED UICC, AND EMBEDDED UICC, EMBEDDED UICC-EQUIPPED TERMINAL, PROVISION METHOD, AND METHOD FOR CHANGING MNO USING SAME

TECHNICAL FIELD

The present invention relates to a method of managing an Embedded Universal Integrated Circuit Card (Hereinafter, referred to as 'eUICC') profile, an eUICC using the same, a terminal equipped with the eUICC, a method of provisioning and a method of changing a Mobile Network Operator (MNO), and more particularly, to a method of managing or handling various profiles in an eUICC by using profile access credentials. Also, the present invention relates to a method for management of eUICC which makes an eUICC use a public key generated dynamically as profile access credentials in an environment in which roles of a subscription manager (SM) are separated.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently use the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

It is being discussed that the SM is responsible for functions such as management of information about eUICC, information about various mobile network operators, authentication on change of mobile network operator, a remote information change, etc. However, details of the functions and roles of the SM has not been defined yet.

Also, in an environment in which the eUICC is used, important profiles can be provided to the eUICC, and so a mechanism for delivering the profiles securely and using them is necessary.

DISCLOSURE

Technical Problem

The present invention provides a method of managing an eUICC.

The present invention also provides a method of managing or handling various profiles (provisioning profiles, operation profiles, etc.) by using profile access credentials.

The present invention also provides a method of management, making an eUICC have at least one set of profile access credentials (for example, a public key of an eUICC, etc.) for securely provisioning various profiles transmitted from an end point (for example, a SM) such as provisioning profiles, operation profiles, etc.

The present invention also provides a method, performed in an eUICC, of managing a profile or profile management data transmitted and received from an end point reliably connected to an MNO system without permitting access from an external entity such as a device or a terminal.

The present invention also provides a method of managing an eUICC in an environment in which a subscription manager (SM) is divided into a subscription manager-secure routing (SM-SR) and a subscription manager-data preparation (SM-DP).

The present invention also provides a method of possessing and managing an encryption key (a public key, etc.) by which a SM-SR can encrypt security information in an environment in which a SM is divided into a SM-SR and a SM-DP.

The present invention also provides a method of providing an encryption key allocated for a corresponding eUICC through a SM-SR, performed in an MNO, in an environment in which a SM is divided into a SM-SR and a SM-DP.

The present invention also provides a method of obtaining and using an encryption key (a public key, etc.) dynamically from a corresponding eUICC through a SM-SR, performed in an MNO.

Technical Solution

An example embodiment of the present invention provides a method of managing a profile by using an embedded universal integrated circuit cart (eUICC) cooperating with a mobile network operator (MNO) system and a subscription manager (SM), comprising receiving, by the eUICC, an encrypted profile from an external entity; and decrypting the encrypted profile by using profile access credentials stored in the eUICC.

Another example embodiment of the present invention provides a method of a method of managing a profile by using an embedded universal integrated circuit cart (eUICC) cooperating with a mobile network operator (MNO) system and a subscription manager (SM), comprising managing the eUICC by the SM; receiving, by the eUICC, a profile, which is a combination of a file structure, data, and an application to be provided to the eUICC, from the MNO or the SM; processing or managing, by the eUICC, the received profile by using profile access credentials which are data used for setting up secured communications between the eUICC and an external entity for protecting and managing a structure and data of the profile; and managing, by the eUICC, the received profile information or the profile information processed using the profile access credentials so that a device or a terminal equipped with the eUICC cannot access the received or processed profile information.

Other example embodiment of the present invention provides an embedded universal integrated circuit card (eUICC) cooperating with an external entity including a mobile network operator (MNO) system and a subscription manager (SM), the eUICC comprising a security module decrypting an encrypted profile downloaded from the external entity by using profile access credentials, wherein the profile means a combination of a file structure, data, and an application which is to be provided to the eUICC.

Still other example embodiment of the present invention provides a terminal equipped with an embedded universal integrated circuit card (eUICC) cooperating with a mobile network operator (MNO) system and a subscription manager (SM), the terminal comprising an issuance processing module generating and managing profile access credential information for managing a profile received from the MNO or the SM, wherein the issuance processing module generates a public key as profile access credentials for the eUICC autonomously or by using an internal separate security module and responds according to a request of the SM, and wherein the issuance processing module receives the profile information encrypted using the public key from the MNO or the SM, and decrypts the profile encrypted by using a secret key or a private key corresponding to the public key.

Still other example embodiment of the present invention provides an embedded universal integrated circuit card (eUICC) cooperating with an external entity including a mobile network operator (MNO) system and a subscription manager (SM), comprising a security module decrypting an encrypted profile according to a request of an issuance processing module in a terminal equipped with the eUICC, wherein the security module additionally has a function of generating a public key corresponding to the eUICC and delivering the generated public key to an external SM according to a request of the issuance processing module.

Still other example embodiment of the present invention provides an embedded universal integrated circuit card (eUICC) cooperating with an external entity including a mobile network operator (MNO) system and a subscription manager (SM), comprising a chip operating system (COS), a SIM platform, and a SIM service management platform, wherein the SIM service management platform includes at least one operational profile about at least one MNO and a security module, and wherein the security module generates and outputs a public key of the eUICC according to a request of the SIM service management platform, and decrypts an encrypted profile received from an external by using a secret key corresponding to the eUICC public key.

Still other example embodiment of the present invention provides a method of provisioning by using an embedded universal integrated circuit cart (eUICC) cooperating with a mobile network operator (MNO) system and a subscription manager-data preparation (SM-DP) and a subscription manager-secure routing (SM-SR) constituting a subscription manager (SM), comprising receiving, by the SM-SR, an eUICC public key from the eUICC, and delivering the eUICC public key to the MNO; encrypting, by the SM-DP, a profile by using the eUICC public key received from the MNO and delivering a first encrypted profile to the MNO; requesting, by the MNO to the SM-SR, a second encrypted profile to which the first encrypted profile is encrypted by using a separate security key; and delivering, by the MNO or the SM-SR, the second encrypted profile which is double ciphered profile information to the eUICC.

Still other example embodiment of the present invention provides a method of changing an MNO by using an embedded universal integrated circuit cart (eUICC) cooperating with a receiving mobile network operator (MNO) system, a donor MNO system, a subscription manager-data preparation (SM-DP) and a subscription manager-secure routing (SM-SR) constituting a subscription manager (SM), comprising receiving, by the SM-SR, an eUICC public key from the eUICC, and delivering the eUICC public key to the receiving MNO; delivering, by the receiving MNO, a notification of an operator change from the donor MNO; encrypting, by the SM-DP, a profile by using the eUICC public key received from the receiving MNO and delivering a first encrypted profile to the receiving MNO; requesting, by the receiving MNO to the SM-SR, a second encrypted profile to which the first encrypted profile is encrypted by using a separate security key; and delivering, by the receiving MNO or the SM-SR, the second encrypted profile which is double ciphered profile information to the eUICC.

DESCRIPTION OF DRAWINGS

FIG. 9 illustrates a procedure of changing MNO according to an example embodiment of the present invention.

MODES OF THE INVENTION

Figure 1:
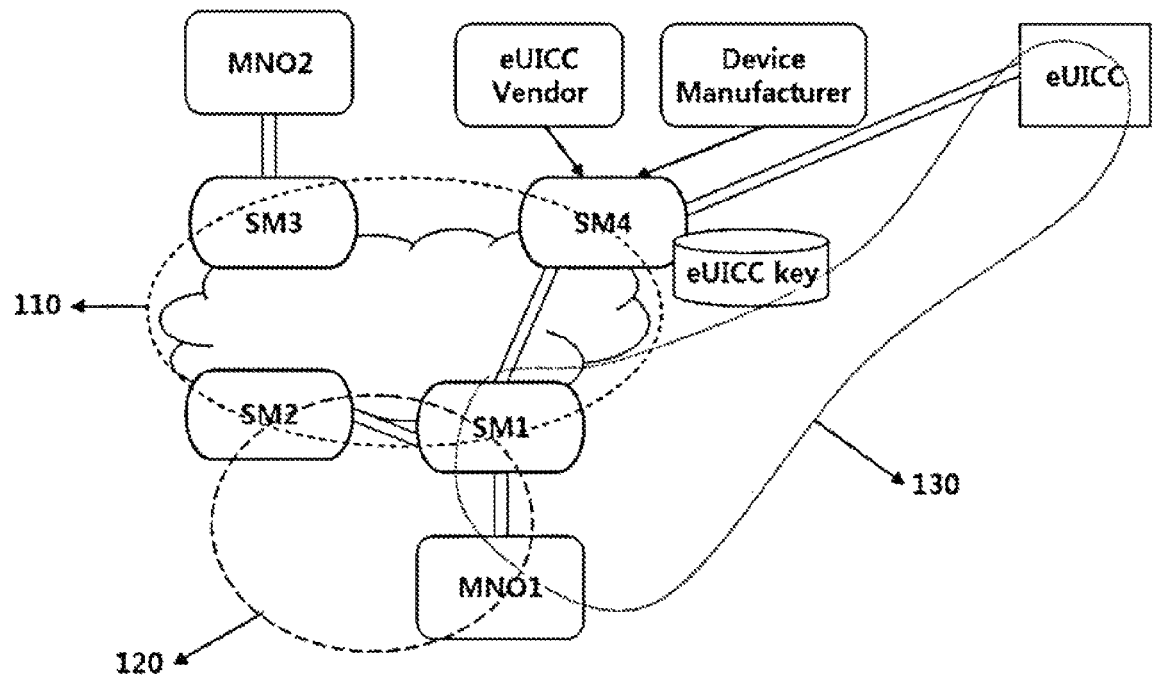
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, in the present invention, a method of managing eSIM using generation of a dynamic encryption key (such as a public key, etc.) is proposed in the above described environment of separated roles of SM defined in the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between an MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

A 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by an MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (an MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of an MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in an MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of an MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by an MNO or a third-party organization. If they are provided by a third-party organization, there may be a commercial relationship between the SM and the MNO.

For managing subscriptions, the SM does not have any direct relationships with subscribers of an MNO. Although an MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by an MNO. Or, an MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required to be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by an MNO.)

3) Calculating an OTA package for downloading by the SM-SR

If the functions of the SM-DP are provided by a third-party organization, security and trusted relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, an MNO, and may be used by an MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
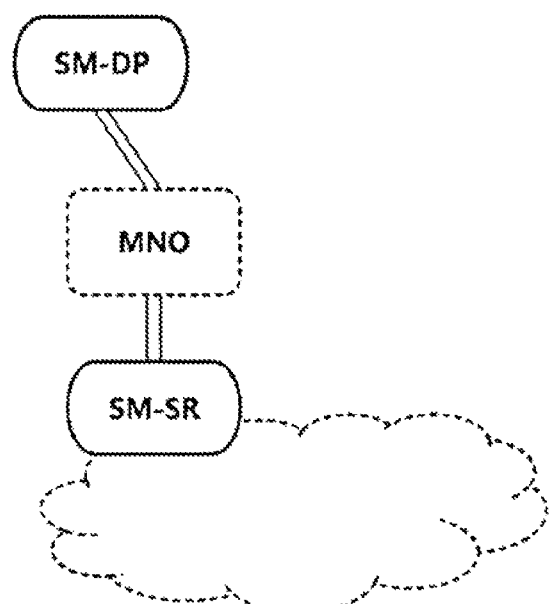
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of an MNO, a provisioning profile, etc.) and a SM-SR for routing them. Also, the SM-SR may interwork with other multiple SM-SRs with trusted relationships, and the SM-DP may interwork with an MNO system.

Of course, arrangement of the SM-DP and the MNO system may be implemented differently from the case of FIG. 2. That is, the SM-DP may interwork with the SM-SR, and the MNO system may interwork with the SM-DP.

Under the above described eUICC system architecture, an eUICC according to an example embodiment of the present invention may comprise a mechanism of guaranteeing integrity, confidentiality, and authenticity for loading various profiles (such as a provisioning profile, an operational profile, etc.). As an example of the mechanisms, an encoding/decoding mechanism using a public key and a private key of an eUICC as profile access credentials and an electronic signature mechanism using a public key and a private key of a SM may be included selectively.

In other words, various profiles should be protected very safely in an eUICC architecture through a safe mechanism which can guarantee integrity, confidentiality, and authenticity. Accordingly, a safe mechanism for protecting the profiles is needed since the profiles are transmitted to an eUICC (not provisioned in a manufacturing step).

An eUICC according to an example embodiment of the present invention may manage or handle various profiles (such as a provisioning profile, an operational profile, etc.) by using profile access credentials in the eUICC.

More specifically, in the present invention, an eUICC have at least one set of profile access credentials (for example, a public key of an eUICC, etc.) for securely provisioning various profiles transmitted from an end point (for example, a SM) such as a provisioning profile, an operational profiles, etc. Also, the eUICC may decode a ciphered profile transmitted by an external entity by using the profile access credentials, as will be explained in a following example embodiment.

In addition, in an example embodiment of the present invention, only a single active profile is preferred to exist in an eUICC. A profile or profile management data should be transmitted between an end point reliably connected to an operating system having the profile or the profile management data and an eUICC. Also, the profile of the profile management data cannot be accessed by an external entity such as a device or a terminal. For this, in an example embodiment of the present invention, a method using an eUICC public key as profile access credentials, which can encode/decode the profile of the profile management data, is included.

In the specification, profile access credentials mean data used for decoding a profile received from an external entity such as a SM or an MNO, and is not limited to the terminology. That is, it may be represented using a different terminology such as profile installation credentials, profile installer credentials, etc. which can perform the same function.

Figure 3:
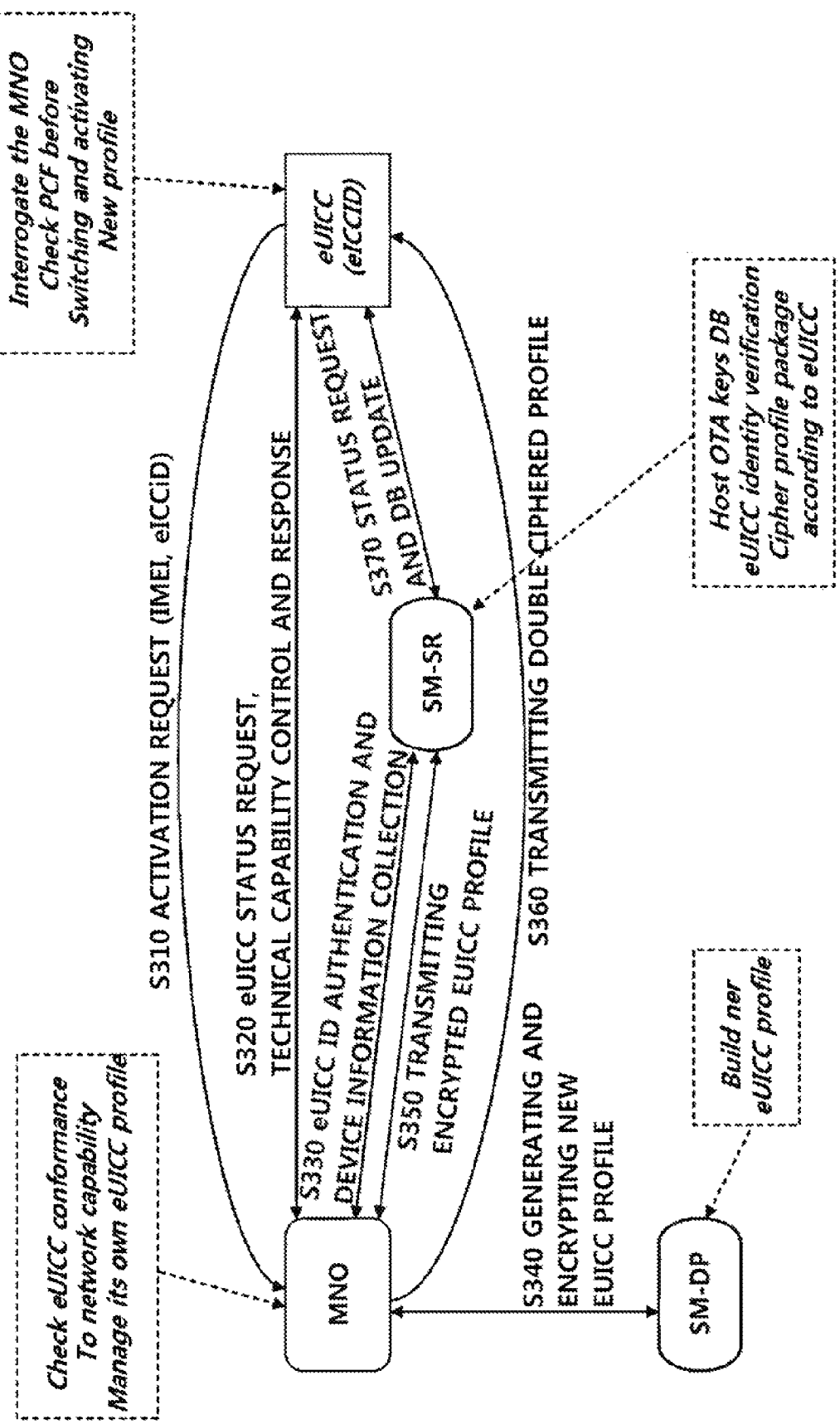
FIG. 3 is a flow chart to explain a provisioning procedure corresponding to a first subscription in a system to which the present invention is applied.

FIG. 3 is a flow chart to explain a provisioning procedure corresponding to a first subscription in a system to which the present invention is applied.

In the provisioning procedure, an eUICC may transmit an activation request including device identification information (such as IMEI, etc.) and eUICC identification information (such as eICCid, etc.) to an MNO (at S310). Then, a request of an eUICC status and request/confirmation of a technical capability control are performed (at S320).

Also, although not illustrated in FIG. 3, a step, in which the eUICC provides its public key (PK) or key information of PKI (information about a key generation algorithm, a key length, a key generation manner, etc.) to a corresponding MNO system or a SM-SR, may be included in the step S320.

In the step S330, the MNO may verify an identity of the eUICC and collect information about the eUICC by cooperating with the SM-SR. In the step S330, the MNO may obtain an encryption key for the eUICC, specifically, a public key corresponding to the eUICC from the SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

Figure 8:
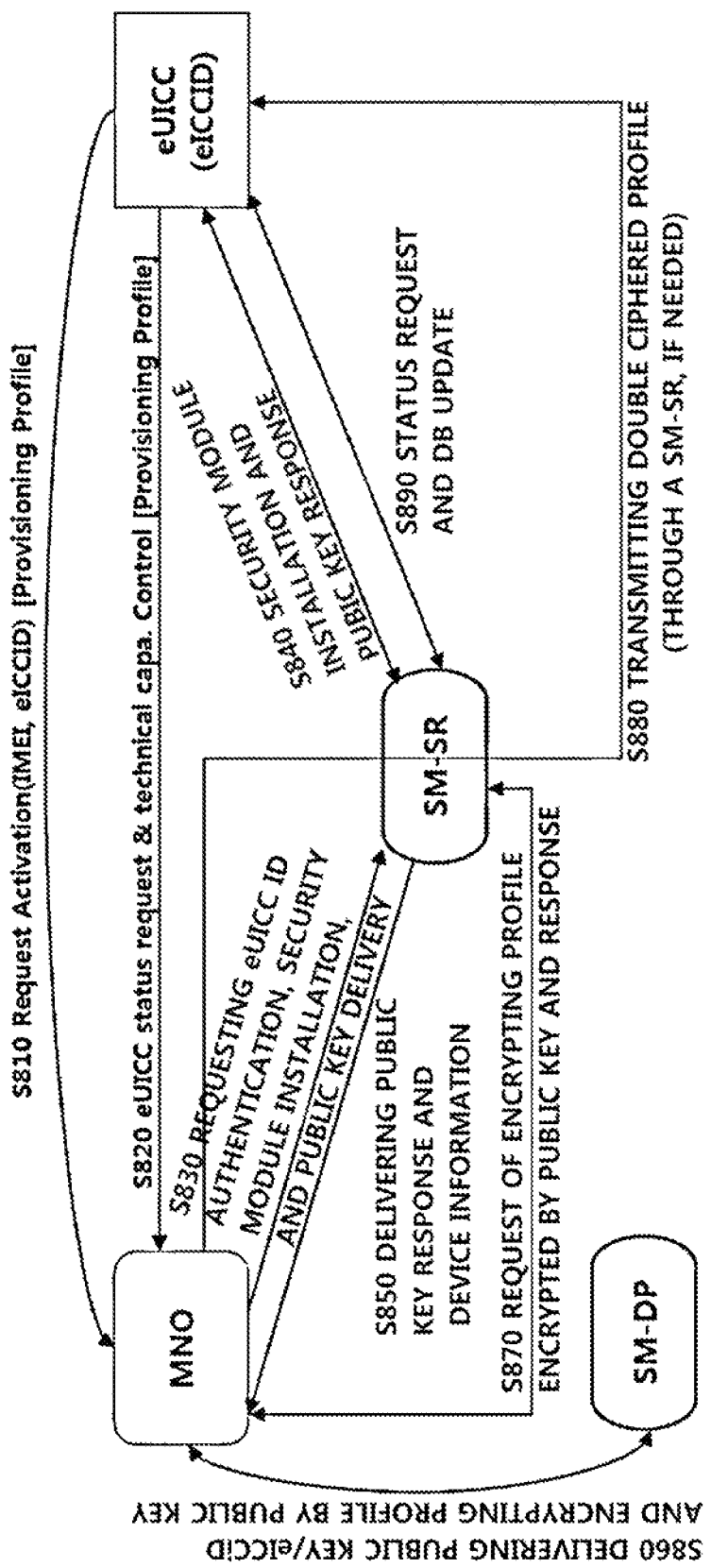
FIG. 8 illustrates a flow of a provisioning procedure (initial opening) according to an example embodiment of the present invention.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, and so on. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S340; a first encryption step). At this time, the SM-DP may generate an additional electronic signature by using its private key in order to provide authenticity. That is, the SM-DP may make an electronic signature on the profile by using its private key for authentication (at S340).

Then, the MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S350).

Then, the MNO may transmit the double ciphered eUICC profile to the corresponding eUICC (at S360). At this time, the public key of the SM-DP or a certification may be transmitted to the eUICC with the eUICC profile in order to provide authenticity.

Since the eUICC already knows the eUICC management key, the eUICC may completely decode the profile to be used for a provisioning by performing a second decoding using the private key corresponding to its public key after the first decoding. The private key is already known in the manufacturing step or from the dynamic generation procedure as explained above. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S370, the SM-SR database may be updated based on status requests and corresponding responses between the eUICC which finished the provisioning and the SM-SR.

Main configurations for the above-described steps are explained as follows.

In the step S310, the eUICC identification information (eICCid, etc.) is open data, and integrated and protected in the eUICC.

In the steps S320 and S330, the status request and the technical capability control may provide verification on the eUICC identity (that is, verification on whether the eUICC is trustable or not), and should be able to verify a feasibility of a characteristic of the eUICC for an MNO service.

In the steps S340 to S360, a double ciphering mechanism is used for generating and transmitting the eUICC profile. In other words, the profile which is linked to the eUICC by the SM-DP is ciphered by a ciphering mechanism which can be read by the target eUICC. Also, an electronic signature may be made by the SM-DP for verifying that the profile has been generated by the right SM-DP. Also, the SM-SR may encrypt the generated profile using the eUICC management key so as to authenticate and protect the profile during delivery.

In the step 370, the SM-SR database may be updated at a final stage of the subscription installation.

Figure 4:
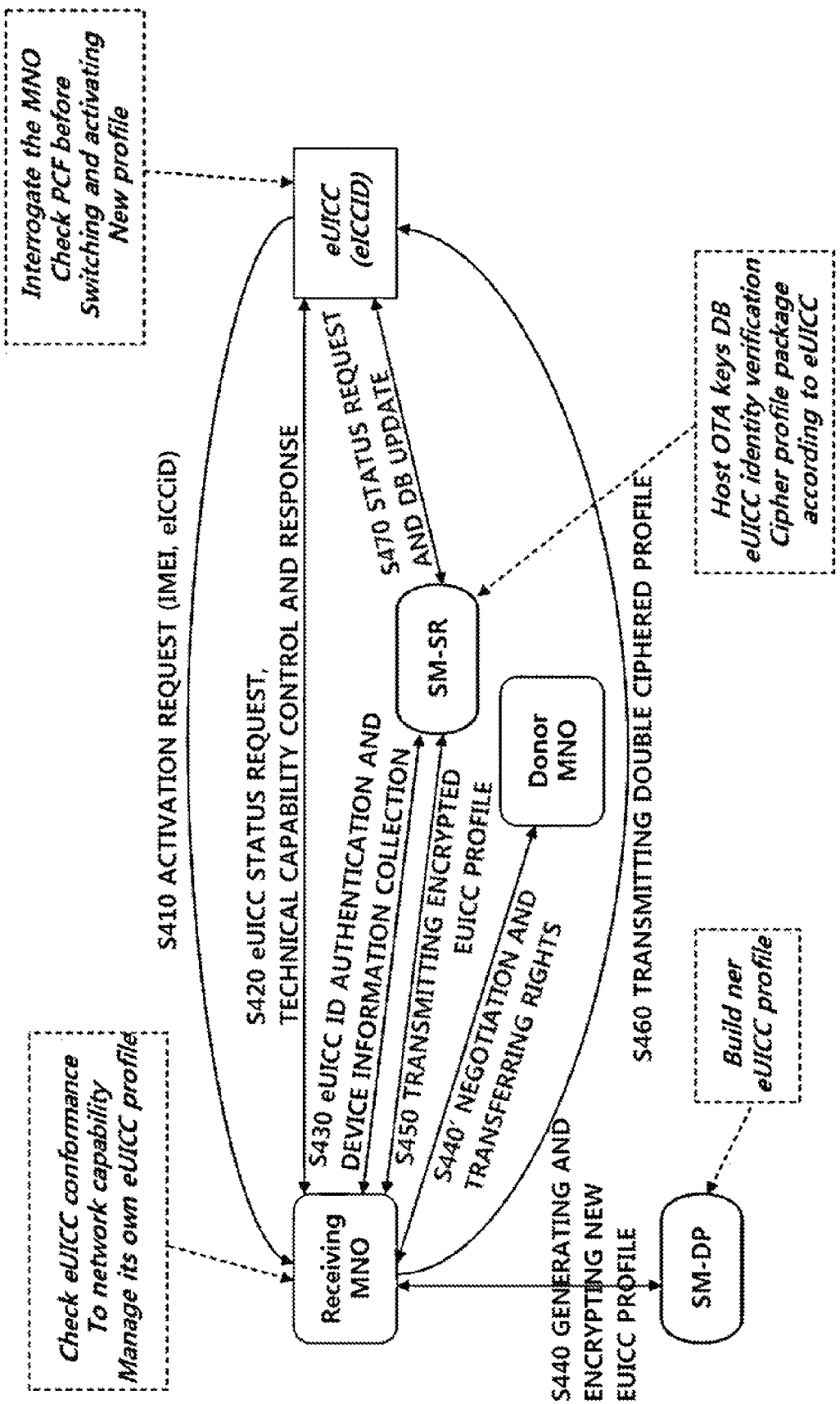
FIG. 4 is a flow chart explaining a procedure for subscription change or MNO change to which the present invention is applied.

FIG. 4 is a flow chart explaining a procedure for subscription change or MNO change to which the present invention is applied.

Generally, the procedure of FIG. 4 is similar to the provisioning procedure of FIG. 3. That is, a new MNO of FIG. 4, after changed, corresponds to an MNO of FIG. 3. The difference between two procedures is that the new MNO performs a procedure of negotiating and transferring right with a donor MNO before or after generation of a profile for the new MNO (at S440').

That is, the difference between an MNO change procedure of FIG. 4 and the provisioning procedure of FIG. 3 is that an activation request is transmitted using a provisioning profile or an operational active profile through a donor MNO OTA bearer, and the new MNO requests a path from the SM-SR in order to download a new profile through one of OTA and OTI.

The MNO change procedure of FIG. 4 is explained in detail as follows.

For changing an MNO, an eUICC may transmit an activation request including device identification information (IMEI, etc.) and eUICC identification information (eICCid, etc.) to a receiving MNO which is to be changed (at S410). Then, an eUICC status request and a technical capability control are performed between the receiving MNO and the eUICC (at S420).

Also, even though not illustrated in FIG. 4, in the step S420 which will be explained in the following, a procedure in which the eUICC may provide its public key (PK) or PKI key information (such as a key generation algorithm, a key length, a key generation manner, etc.) which is profile access credential information, to the corresponding MNO system or the SM-SR may be included. This is similar to the provisioning procedure S320.

In a step S430, the receiving MNO may perform an eUICC identity verification and collect information about the device (eUICC) by interworking with the SM-SR. Also, according to an example embodiment of the present invention, the MNO may obtain an encryption key for the corresponding eUICC, specifically, a public key corresponding to the eUICC from a SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, etc. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The receiving MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S440; a first encryption step). At this time, the SM-DP may generate an additional electronic signature by using its private key in order to provide authenticity. That is, the SM-DP may make an electronic signature on the profile by using its private key for authentication in the step S440.

Also, a step S440' of negotiating and transferring right may be performed before or after the step S440. This step S440' is a procedure in which the receiving MNO requests the previous MNO (the donor MNO) to verify whether the eUICC is right or not and to transfer rights (information) according to the change of MNO.

In other words, in the step S440', the new receiving MNO may request authentication on the donor MNO for the subscription switching, and this authentication may be provided through a policy control function.

Then, the receiving MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S450).

Then, the MNO may transmit the double ciphered eUICC profile to the corresponding eUICC (at S460). At this time, the public key of the SM-DP or a certification may be transmitted to the eUICC with the eUICC profile in order to provide authenticity.

Since the eUICC already knows the eUICC management key, the eUICC may completely decode the profile to be used for change of MNO by performing a second decoding using the private key corresponding to its public key after the first decoding. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

It the step S470, the SM-SR database may be updated based on status requests and corresponding responses between the eUICC which finished the provisioning and the SM-SR.

The environment of SM role separation proposed in the GSMA may give appropriate flexibility and securing business initiative to the eSIM environment. That is, the flexibility can be achieved since all MNOs assign a role of interworking with other MNOs to a SM-SR. Also, the business initiative can be secured since an MNO generally may be responsible for a role of the SM-DP, and operator information of communication and value-added services may be built by the SM-DP. However, since detail eSIM management schemes based on the above-mentioned structure do not exist, there are difficulties in achieving security of each operator information and defining issuance flow when the eSIM system is introduced.

Thus, the present invention proposes a structure in which an eUICC interoperable with an MNO system and a subscription manager (SM) may have profile access credential information (a public key, and a private key, etc. of the eUICC) for managing profile information received from the MNO and the SM. Also, in the structure, it is not permitted for a device or a terminal in which the eUICC is installed to access the profile information. Also, in the structure, the profile access credential information may be used for processing (decoding, etc.) the received profile information.

Hereinafter, an example embodiment of the present invention will be explained. Also, the environment of separated SM roles proposed in the GSMA, a public key and a private key corresponding to the public key of an eUICC, as an example of a profile access credential, will be explained. However, the example of profile access credentials is not limited to the following description.

Also, in the following descriptions, one of operator information (or, an operational profile) and a provisioning profile are explained as an example of profile information to be processed or managed. However, the profile information is not limited to the following description. That is, the present invention may be applied to all information authenticity of which is guaranteed by an eUICC.

Hereinafter, a structure of basic opening, a structure and a process of moving to other company will be explained in detail as a method of safely managing an eSIM by using dynamic generation of a public key which is profile access credentials.

The basic upper structure according to the present invention is based on the eSIM structure depicted in FIG. 1. In this specification, a SM represented in figures may be a single SM entity or SM entities of a 'Circle of Trust'.

Figure 5:
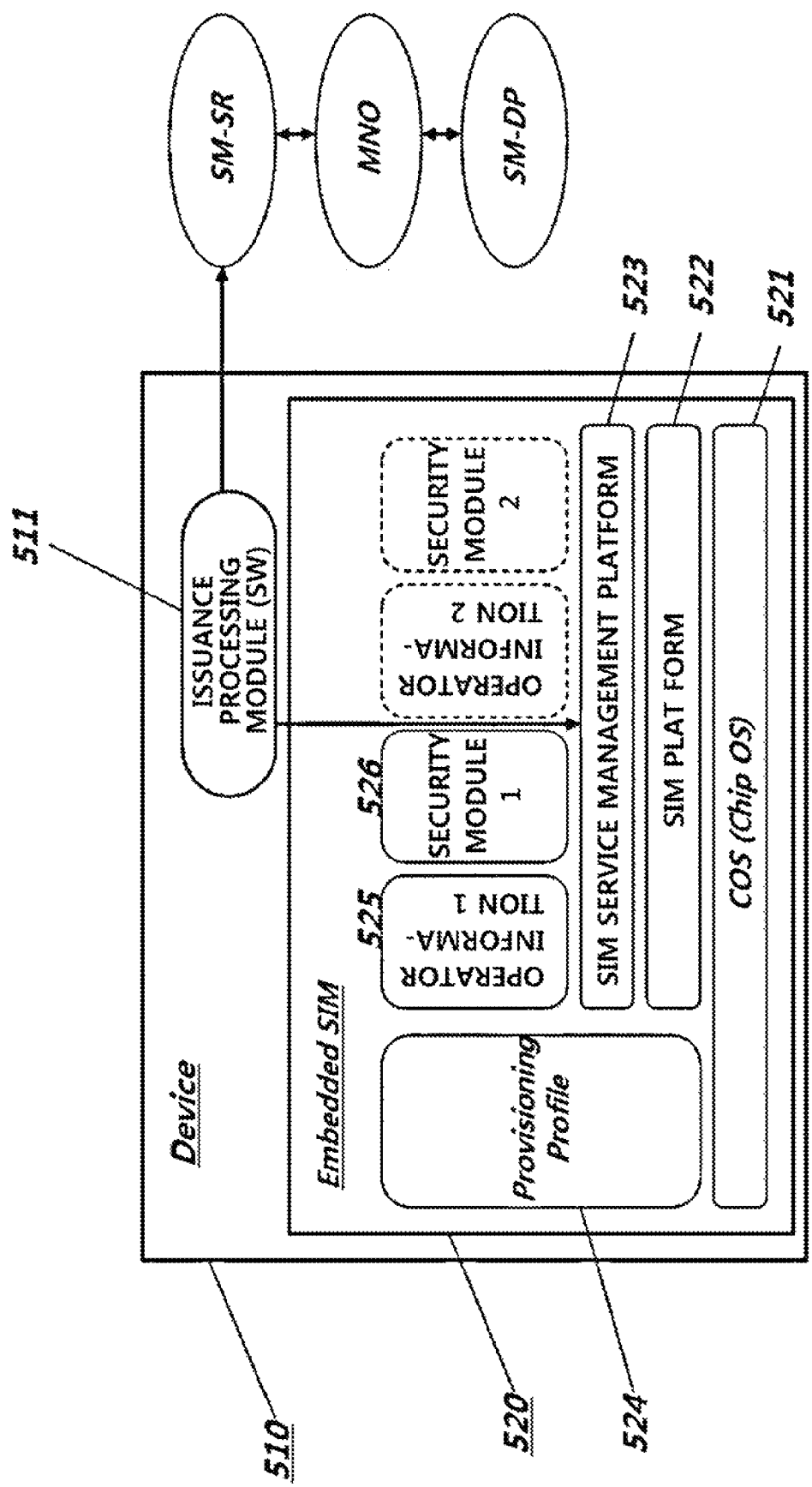
FIG. 5 illustrates an internal structure of an eUICC or an eSIM according to an example embodiment of the present invention.

FIG. 5 illustrates an internal structure of an eUICC or an eSIM according to an example embodiment of the present invention.

The eUICC 520 according to an example embodiment of the present invention may be included in a device or a terminal 510 as being non-removable, and may include an chip operating system (COS) 521 of the lowest level, a SIM platform 522 of a level over the COS level, a SIM service management platform 523 over the SIM platform level, etc. Also, a provisioning profile 524 for various communication or value-added M2M services may exist on the COS.

Also, operator information 525 or an operational profile for each operator, and a security module 526 corresponding to them may be included on the SIM service management module 523.

At least one operational profile and at least one security module may be included for each operator or each MNO. However, it is preferred that only a single operational profile is activated at a certain time.

Also, an issuance processing module 511 interoperable with an eUICC may be included in the terminal 510, which is a module for processing communications and processes needed for issuing between the eSIM and a SM, and can be implemented in a form of software. A function of the issuance processing module will be explained in detail by referring to FIGS. 8 and 9 in the following.

Explaining the structure depicted in FIG. 5 again, an overall system to which the present invention is applied may comprise an eUICC 520 including a provisioning profile 524, a device 510 equipped with the eUICC 520, the issuance processing module 511 which processes communications and processes needed for issuing between the eSIM and a SM, and an eUICC infrastructure (the right portion of FIG. 4) including a SM-SR, an MNO, a SM-DP, etc.

The issuance processing module 511 which is a software existing in the device may perform a procedure of issuing related to the eUICC by communicating with the eUICC infrastructure. In the procedure, the issuance processing module may perform secure communications (such as TLS/SSL, etc.) with the eUICC infrastructure, and the corresponding software module should be located in a safe space of the device and operate so that it can be protected from an external hacking.

A provisioning profile 524 exists in the eUICC. When an issuance is required to be processed, all MNOs should enable communications between the device equipped with the eUICC and the eUICC infrastructure based on the corresponding provisioning profile. Also, included in the eUICC are the SIM service management platform 524 storing/managing an operational profile or an MNO profile and a security module 526 by interworking with an eUICC management key (for example, an UICC OTA key, a global platform issuer security domain (GP ISD) key, etc.) managed by a SM-SR, the SIM platform 523, and the COS 521.

Here, the security module 526 is an application such as an applet, etc. which performs a role of generating a pair of a public key and a private key according to a public key infrastructure (PKI) manner for each operator, and may exist respectively for each operator or exist being shared by a plurality of MNOs. In addition to the generation of the pair of keys, the security module 526 may perform a role of decoding the operator information or the operational profile encrypted by the public key of the eUICC with the generated private key interworking with the issuance processing module 511 or the SIM service management platform 523, and perform verification on an electronic signature on the operator information which is signed with the private key of the operator.

The issuance processing module in the specification may perform a role of communicating with the outside of the terminal and management of a provisioning. Thus, the issuance processing module may be also referred to as a communication module, a provisioning module, an issuance module, an opening module, etc. without being limited to a specific terminology.

Also, the security module may be also referred to as an encryption key generation module, an encryption key processing module, a profile installer, etc. That is, the security module may perform generation of an encryption key and a security computation using the encryption key. The above procedure will be explained in further detail in the following description.

Figure 6:
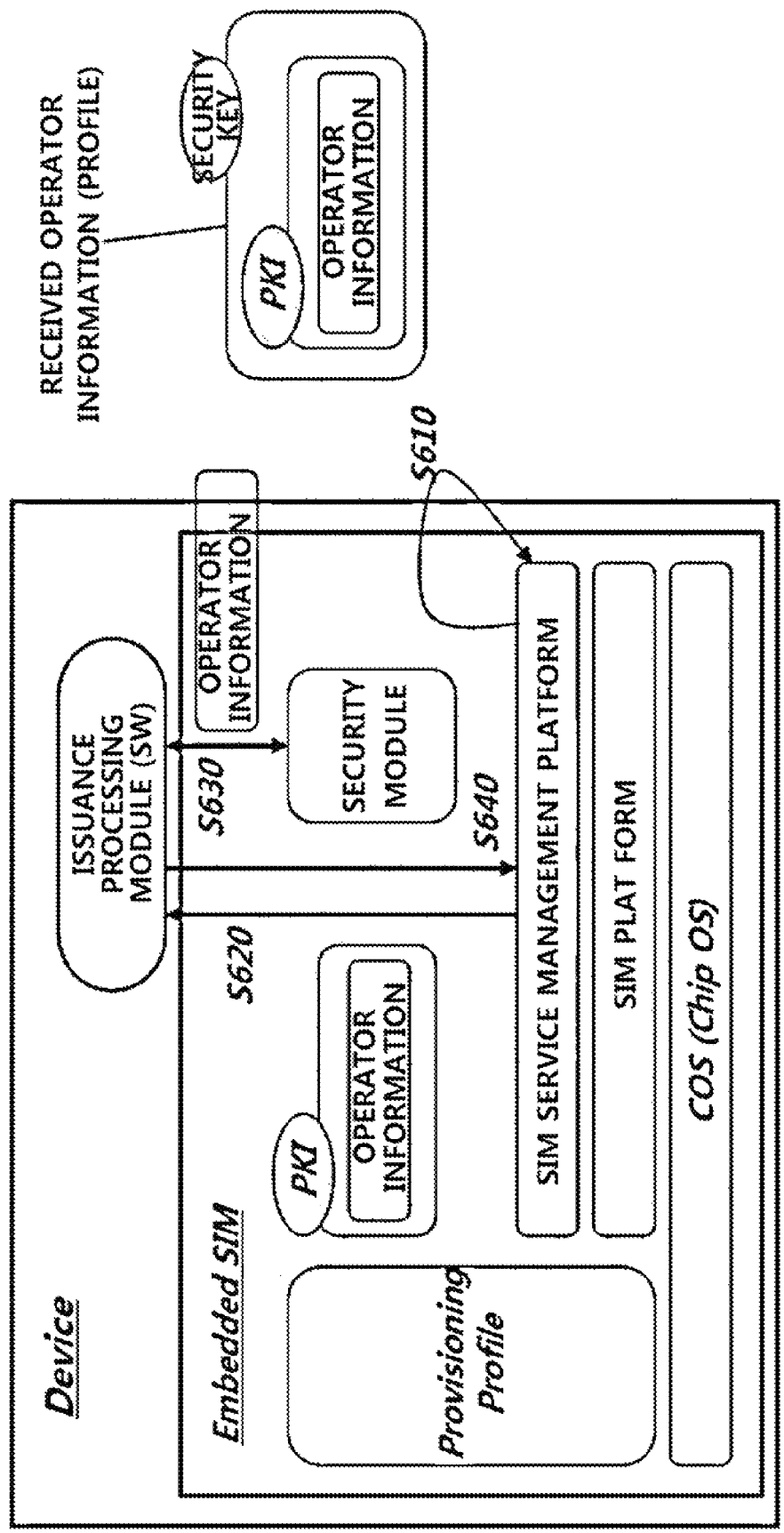
FIG. 6 illustrates a structure of installing operator information (a lead of an issuance processing module) of an eUICC or an eSIM according to an example embodiment of the present invention.
Figure 7:
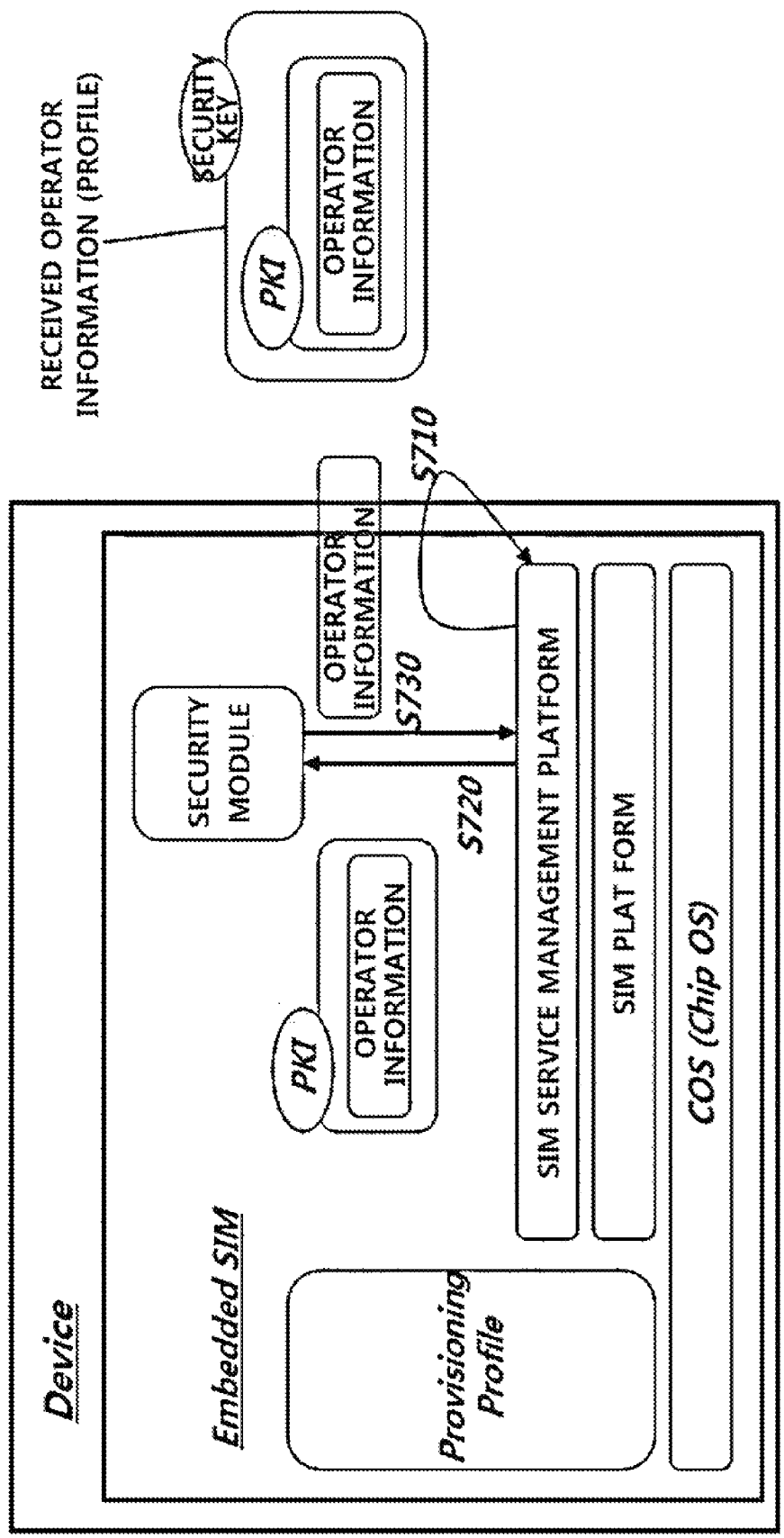
FIG. 7 illustrates a structure of installing operator information (an MNO profile) in a case in which SIM service management platform leads the installing.

FIG. 6 illustrates a structure of installing operator information (a lead of an issuance processing module) of an eUICC or an eSIM according to an example embodiment of the present invention, and FIG. 7 illustrates a structure of installing operator information (an MNO profile) in a case in which SIM service management platform leads the installing.

Referring to FIG. 6, an eUICC according to an example embodiment of the present invention and a terminal in which the eUICC is installed may receive a double ciphered profile (for example, operator information or an operational profile in FIGS. 6 and 7) from an external entity (for example, a SM-SR, etc.).

The double ciphered profile has been primarily ciphered with a public key (PKI), profile access credential of the corresponding eUICC as shown in the right portion of FIG. 6, and secondly ciphered with a separate security key such as an eUICC management key.

When the double ciphered profile is received, the eUICC may perform a first decoding on the profile with the eUICC management key or a security key which are already known by using the SIM service management platform (at S610). Then, profile information ciphered with the eUICC public key (PKI) is generated, and the SIM service management platform may request a PKI decoding by transmitting the profile information to an issuance processing module of the terminal (at S620).

The issuance processing module transmits the decoding request of the step S620 to a corresponding security module of the eUICC, and receives a final profile which is deciphered with a private key corresponding to the corresponding PKI from the security module (at S630).

Then, the issuance processing module may transmit the completely deciphered operator information to the SIM service management platform, and install it (at S640).

The above described procedure of FIG. 6 is a procedure led by an issuance processing module. However, a procedure of decoding an operational profile is not limited to the above described procedure, and can be performed in a SIM service management module led manner as shown in FIG. 7.

That is, as shown in FIG. 7, a terminal may receive the double ciphered profile (for example, operator information or an operational profile in FIGS. 6 and 7) from an external entity (for example, a SM-SR, etc.).

The double ciphered profile has been primarily ciphered with a public key (PKI), profile access credentials of the corresponding eUICC as shown in the right portion of FIG. 7, and secondly ciphered with a separate security key such as an eUICC management key.

When the double ciphered profile is received, the eUICC may perform a first decoding on the profile with the eUICC management key of a security key which are already known by using the SIM service management platform (at S710). Then, profile information ciphered with the eUICC public key (PKI) is generated, and the SIM service management platform may request a PKI decoding by transmitting the profile information to an issuance processing module of the terminal (at S720).

Then, the SIM service management platform receives a final profile which is deciphered with a private key corresponding to the corresponding PKI from the security module, and install the final profile (at S730).

That is, conventional data issuance through interworking with the SIM service management platform may be performed only through an eUICC management key of a security key. However, in the present invention, operator information is authenticated and ciphered by using the eUICC management key or the security key, and the a procedure of ciphering again the operator information ciphered with the public key through a security module installed in the eSIM for each operator. At this time, an entity request the decoding to the security module is the issuance processing module as shown in FIG. 6, or the SIM service management platform as shown in FIG. 7. The case of FIG. 7 is securer than the former case.

FIG. 8 illustrates a flow of a provisioning procedure (initial opening) according to an example embodiment of the present invention.

In the present invention, provisioning profiles for performing issuance through networks of all MNOs (that is, arbitrary MNO) are pre-loaded in an eSIM or an eUICC. Also, eUICC identification information for identifying each eUICC according to the GSMA proposed structure exist in the eUICC, and the eUICC can be identified with the identification information during whole issuance procedures.

A first subscription in the present invention is performed using a provisioning profile pre-loaded in the eUICC as follows.

First, a device in which the eUICC is installed transmits a request of opening with device identification information and eUICC identification information (IMEI and eICCiD, etc.) through the provisioning profile by using an issuance processing module (at S810). The procedure of requesting opening may be represented as a procedure of requesting activation.

Then, an MNO may obtain eUICC status and information about supported networks and additional functions (for example, SIM additional service functions, etc.) by communicating with an issuance processing module in a device in which the eUICC is installed through the provisioning profile.

At this time, it can be checked whether a security module is installed in the eUICC or not. When the security module is already installed in the eUICC, the MNO may obtain information about a public key (PKI key information; including information about algorithm, length, generation manner, etc.) of the eUICC (at S820). The step S820 may be represented as a procedure of eUICC status request and technical capability control.

Then, the MNO requests a SM-SR to verify the eUICC identification information (eICCID, etc.), to install a security module, and to transfer an encryption key (a public key, etc.) generated in the eUICC (at S830). Here, to install a security module can be omitted if a security module has been already installed.

Then, at a step S840, the SM-SR installs a security module in the eUICC through the issuance processing module by using an eUICC management key or a security key, interworking with a SIM service management platform. Also, the SM-SR receives an encryption key (a public key, etc.) generated by the security module in the eUICC and information about the encryption key or the public key (such as a key generation algorithm, a key length, etc.). Here, the installation of a security module can be omitted if a security module has been already installed.

Then, the SM-SR may transmit the encryption key (a public key, etc.) generated by the security module in the eUICC, if necessary, information about the encryption key or the public key (such as a key generation algorithm, a key length, etc.), and device information to the MNO (at S850).

The MNO may transmit the encryption key (a public key, etc.), if necessary, information about the encryption key (such as a key generation algorithm, a key length, etc.), and eUICC identification information (eICCiD, etc.) to the SM-DP. The SM-DP may encrypts a profile of operational information (communication data, additional service application, additional service data, and so on) corresponding to the eUICC identification information by using the encryption key (the public key) transmitted from the MNO, and transmit the ciphered profile to the MNO. At this time, the SM-DP may perform an electronic signature on the profile using it private key in order to provide a certificate (at S860).

Then, the MNO may request a SM-SR to encrypt the operator information profile encrypted by the eUICC public key by using a separate eUICC management key or security key. The SM-SR may perform an encryption (a second encryption) on the profile using the eUICC management key or security key, and transmit the second ciphered profile to the MNO (at S870). The MNO may issue the operator information in the device through the SM-SR (at S880). At this time, if authenticity is provided, the public key of the SM-DP may be transmitted to the device.

Finally, the SM-SR may perform updates of status and database by communicating with the issuance processing module in the eUICC (at S890).

One or more of the steps S810 to S890 may be implemented as integrated into a single step, if it is needed for implementation.

FIG. 9 illustrates a procedure of changing MNO according to an example embodiment of the present invention.

The procedure of changing MNO may be configured as follows.

First, a device in which the eUICC is installed transmits a request of opening with device identification information and eUICC identification information (IMEI and eICCiD, etc.) through the provisioning profile by using an issuance processing module (at S910).

Then, a receiving MNO B may obtain eUICC status and information about supported networks and additional functions (for example, SIM additional service functions, etc.) by communicating with an issuance processing module in a device in which the eUICC is installed through the provisioning profile (at S920). At this time, it can be checked whether a security module is installed in the eUICC or not. When the security module is already installed in the eUICC, the MNO may obtain information about a public key (PKI key information; including information about algorithm, length, generation manner, etc.) of the eUICC.

The receiving MNO B may transmit a notification of MNO change to a donor MNO A based on the information received in the above procedure, and received a response value for the notification from the donor MNO A. That is, a procedure of negotiation and transferring rights in which the new receiving MNO requests the previous MNO (the donor MNO) to verify whether the corresponding eUICC is right or not and to transfer rights (information) according to the MNO change (at S930).

Then, the receiving MNO B requests a SM-SR to verify the eUICC identification information (eICCiD, etc.), to install a security module, and to deliver an encryption key (a public key, etc.) generated in the eUICC. Here, to install a security module can be omitted if a security module has been already installed (at S940).

The SM-SR installs a security module in the eUICC through the issuance processing module by using an eUICC management key or a security key, interworking with a SIM service management platform. Also, the SM-SR receives an encryption key (a public key, etc.) generated by the security module in the eUICC and information about the encryption key or the public key (such as a key generation algorithm, a key length, etc.) (at S950). Here, the installation of a security module can be omitted if a security module has been already installed.

The SM-SR may transmit the encryption key (a public key, etc.) generated by the security module in the eUICC, if necessary, information about the encryption key or the public key (such as a key generation algorithm, a key length, etc.), and device information to the receiving MNO (at S960).

The receiving MNO B may transmit the encryption key (a public key, etc.), if necessary, information about the encryption key (such as a key generation algorithm, a key length, etc.), and eUICC identification information (eICCiD, etc.) to the SM-DP. The SM-DP may encrypt a profile of operation information (communication data, additional service application, additional service data, and so on) corresponding to the eUICC identification information by using the encryption key (the public key) transmitted from the MNO, and transmit the ciphered profile to the MNO. At this time, the SM-DP may perform an electronic signature on the profile using it private key in order to provide a certificate (at S970).

Then, the MNO B may request a SM-SR to encrypt the operator information profile encrypted by the eUICC public key by using a separate eUICC management key or security key. The SM-SR may perform an encryption (a second encryption) on the profile using the eUICC management key or security key, and transmit the second ciphered profile to the MNO B (at S980).

The MNO B may issue the operator information in the device through the SM-SR (at S990). At this time, if authenticity is provided, the public key of the SM-DP may be transmitted to the device.

Finally, the SM-SR may perform updates of status and database by communicating with the issuance processing module in the eUICC (at S1000).

One or more of the steps S910 to S1000 may be implemented as integrated into a single step, if it is needed for implementation.

By using an example embodiment of the present invention, an eUICC may guarantee integrity, confidentiality, and authenticity for loading various profiles (such as a provisioning profile, operational profile, etc.).

Also, the various profiles can be protected very safely in an eUICC architecture through a safe mechanism which can guarantee integrity, confidentiality, and authenticity. Accordingly, since the various profiles are transmitted into the eUICC (not provided at a manufacturing step of the eUICC), the very safe mechanism may be provided for protecting the various profiles.

Also, the profile and the profile management data may be transmitted safely between an end point reliably connected to an operator system which owns the profile and the profile management data and the eUICC. There is an effect that the profile and the profile management data cannot be accessed by an external entity such as a device or a terminal.

Especially, in accordance with an example embodiment of the present invention, a pair of a public key and a private key is generated dynamically at every issuance times instead of using a pair of a fixed public key and a private key is not used, and so security of operator information issuance for the eUICC may be enhanced. Also, a practical eUICC issuance infrastructure may be achieved through a minimized change of the existing standardized technologies.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of protecting operating profiles transmitted to an embedded universal integrated circuit card (eUICC) from a mobile network operator (MNO) system and a subscription manager (SM), the method comprising: receiving, by the eUICC, an encrypted profile from an external entity; and decrypting the encrypted profile by using a private key stored in and generated by the eUICC or a terminal equipped with the wherein the encrypted profile is encrypted by using a public key of the eUICC, and the private key is profile access credentials or a secret key corresponding to the public key of the eUICC, wherein the SM includes a subscription manager-data preparation (SM-DP) and a subscription manager-secure routing (SM-SR), the SM-DP encrypts the profile by using the public key of the eUICC, and the SM-SR successively encrypts the profile, which has been encrypted using the public key, by using a separate management key so that the encrypted profile becomes a double ciphered profile, and wherein the encrypted profile is the double ciphered profile, and the eUICC successively decrypts the encrypted profile by using the separate management key and then decrypts the profile, which has been decrypted using the separate management key, by using the private key of the eUICC wherein the private key is dynamically generated at every issuance time.

2. The method of claim 1, wherein the profile includes at least one information of a provisioning profile for provisioning, an operational profile, MNO credential information or package information comprising MNO credential information, an International Mobile Subscriber Identity (IMSI), the management key such as an UICC OTA key, a GP ISD key, value-added application, and value-added service data.

3. The method of claim 1, wherein the public key is generated by the eUICC.

4. The method of claim 1, wherein the eUICC transmits a key generation algorithm, for generating the public key, to the SM.

5. An embedded universal integrated circuit card (eUICC) configured to protect operating profiles transmitted from an external entity including a mobile network operator (MNO) system and a subscription manager (SM), comprising a security module decrypting an encrypted profile downloaded from the external entity by using a private key generated by the eUICC, wherein the profile is a combination of a file structure, data, and an application to be provided to the eUICC wherein the encrypted profile is encrypted by using a public key of the eUICC, and the private key is profile access credentials or a secret key corresponding to the public key of the eUICC, wherein the SM includes a subscription manager-data preparation (SM-DP) and a subscription manager-secure routing (SM-SR), the SM-DP encrypts the profile by using the public key of the eUICC, and the SM-SR successively encrypts the profile, which has been encrypted using the public key, by using a separate management key so that the encrypted profile becomes a double ciphered profile, and wherein the encrypted profile is the double ciphered profile, and the eUICC successively decrypts the encrypted profile by using the separate management key and then decrypts the profile, which has been decrypted using the separate management key, by using the private key of the eUICC wherein the private key is dynamically generated at every issuance time.

6. The embedded universal integrated circuit card of the claim 5, wherein the private key is profile access credentials uniquely allocated to the eUICC and corresponding to a public key.

7. A terminal equipped with an embedded universal integrated circuit card (eUICC) configured to protect operating profiles transmitted from a mobile network operator (MNO) system and a subscription manager (SM), the terminal comprising an issuance processing module generating and managing profile access credential information for managing a profile received from the MNO or the SM, wherein the issuance processing module generates a public key as profile access credentials for the eUICC autonomously or by using an internal separate security module and responds according to a request of the SM, and wherein the issuance processing module receives the profile information encrypted using the public key from the MNO or the SM, and decrypts the profile encrypted by using a secret key or a private key corresponding to the public key, wherein the secret key and the private key are generated by the eUICC or a terminal equipped with the eUICC wherein the SM includes a subscription manager-data preparation (SM-DP) and a subscription manager-secure routing (SM-SR), the SM-DP encrypts the profile by using the public key of the eUICC, and the SM-SR successively encrypts the profile, which has been encrypted using the public key, by using a separate management key so that the encrypted profile becomes a double ciphered profile, and wherein the encrypted profile is the double ciphered profile, and the eUICC successively decrypts the encrypted profile by using the separate management key and then decrypts the profile, which has been decrypted using the separate management key, by using the private key of the eUICC wherein the private key is dynamically generated at every issuance time.

8. The terminal of claim 7, wherein the issuance processing module installs the security module according to a request of the SM-SR.

9. The terminal of claim 8, wherein, when the issuance processing module responds to the SM-SR with the public key of the eUICC, the issuance processing module delivers encryption information of the public key including information about a key generation algorithm and a key length.

10. The terminal of claim 8, wherein the encrypted profile information is double ciphered information successively encrypted by using both the public key of the eUICC and the separate management key of the eUICC.

11. The terminal of claim 10, wherein the double ciphered profile information includes electronic signature information generated by using the private key of the SM-DP or the MNO which generates the profile.

12. A method of protecting operating profiles transmitted to an embedded universal integrated circuit cart (eUICC) from a mobile network operator (MNO) system, a subscription manager-data preparation (SM-DP) and a subscription manager-secure routing (SM-SR) constituting a subscription manager (SM), the method comprising:
- receiving, by the SM-SR, an eUICC public key from the eUICC, and delivering the eUICC public key to the MNO;
- encrypting, by the SM-DP, a profile by using the eUICC public key received from the MNO and delivering a first encrypted profile to the MNO;
- requesting, by the MNO to the SM-SR, a second encrypted profile, which is the first encrypted profile encrypted by using a security key generated by the eUICC or a terminal equipped with the eUICC;
- delivering, by the MNO or the SM-SR, the second encrypted profile which is double ciphered profile information to the eUICC;
- decrypting, by the eUICC, original profile information from the double ciphered profile information by decrypting the double ciphered profile information firstly by using the security key and secondarily by using the private key corresponding to the eUICC public key wherein the private key is dynamically generated at every issuance time;
- transmitting, by the eUICC, an activation request including eUICC identification information (eUICCiD) to the MNO; and
- identifying, between the MNO and the eUICC, a status and a technical performance of the eUICC.

13. The method of claim 12, wherein in encrypting, by the SM-DP, the profile by using the eUICC public key received from the MNO, the profile is electronically signed by the SM-DP according to an electronic signature expected by the eUICC.

* * * * *